United States Patent Office 3,342,804
Patented Sept. 19, 1967

3,342,804
MONOAZO DYES
Curt Mueller, Basel, Switzerland, assignor to
Sandoz Ltd., Basel, Switzerland
No Drawing. Filed Feb. 13, 1964, Ser. No. 344,538
Claims priority, application Switzerland, Feb. 15, 1963,
1,945/63; May 31, 1963, 6,821/63, 6,822/63; July 1,
1963, 8,133/63
8 Claims. (Cl. 260—207.1)

This invention relates to 4-nitro-4'-dialkylamino-1,1'-azobenzenes having the Formulae I to X set out in the following, to the process of their production, to their use for dyeing, padding and printing, and to the materials thus dyed, padded or printed. All of these dyes, by virtue of their similar structure, can be used for the same purposes and they are employed preferably for the dyeing of fibres and fibre materials made from linear aromatic polyesters and cellulose esters. In the formula

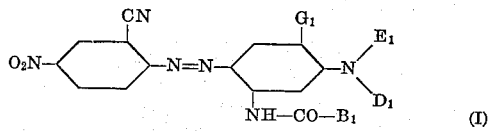
(I)

$B_1$ stands for a low-molecular, substituted or unsubstituted alkyl radical,
$D_1$ for a low-molecular alkyl radical,
$E_1$ for a low-molecular alkyl radical, and
$G_1$ for a hydrogen atom or for a substituted or unsubstituted alkyl or alkoxy radical.

All the alkyl radicals may be saturated or unsaturated, branched or unbranched. The alkyl radicals $D_1$ and $E_1$ can form a saturated ring which may contain further hetero atoms in addition to the adjacent N atom shown in Formula I. These dyes yield blue to greenish blue dyeings.

In formula

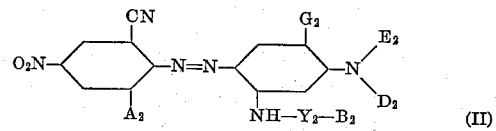
(II)

$A_2$ stands for a hydrogen, chlorine or bromine atom,
$B_2$ for a low-molecular substituted or unsubstituted alkyl radical,
$D_2$ for a low-molecular alkyl radical,
$E_2$ for a low-molecular alkyl radical,
$G_2$ for a hydrogen atom or a substituted or unsubstituted alkyl or alkoxy radical and
$Y_2$ for COO or $SO_2$.

All the alkyl radicals can be saturated or unsaturated, branched or unbranched. The alkyl radicals $D_2$ and $E_2$ can form a saturated ring which may contain further hetero atoms in addition to the adjacent N atom shown in the formula. $A_2$ represents preferably chlorine or bromine. These dyes give ruby to greenish blue dyeings.

In the formula

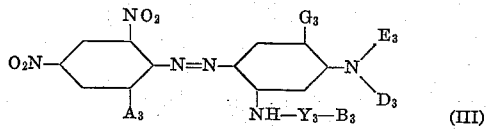
(III)

$A_3$ stands for a hydrogen, chlorine or bromine atom,
$B_3$ for a low-molecular, substituted or unsubstituted alkyl radical,
$D_3$ for a low-molecular alkyl radical,
$E_3$ for a low-molecular alkyl radical,
$G_3$ for a hydrogen atom or a substituted or unsubstituted alkyl or alkoxy radical and
$Y_3$ for CO, COO or $SO_2$.

All the alkyl radicals can be saturated or unsaturated, branched or unbranched. The alkyl radicals $D_3$ and $E_3$ can form a saturated ring which may contain further hetero atoms in addition to the adjacent N atom shown in the formula. With these dyes ruby to greenish blue dyeings are obtained.

In the formula

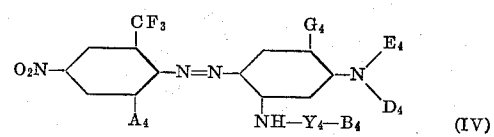
(IV)

$A_4$ stands for a hydrogen, chlorine or bromine atom,
$B_4$ for a low-molecular substituted or unsubstituted alkyl radical,
$D_4$ for a low-molecular alkyl radical,
$E_4$ for a low-molecular alkyl radical,
$G_4$ for a hydrogen atom or a substituted or unsubstituted alkyl or alkoxy radical and
$Y_4$ for CO, COO or $SO_2$.

All the alkyl radicals can be saturated or unsaturated, branched or unbranched. The alkyl radicals $D_4$ and $E_4$ can form a saturated ring which may contain further hetero atoms in addition to the adjacent N atom shown in the formula. With these dyes red to blue dyeings are obtained.

In the formula

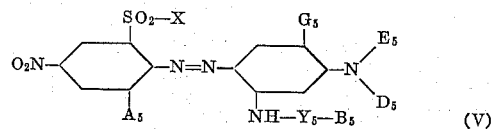
(V)

$A_5$ stands for a hydrogen, chlorine or bromine atom,
$B_5$ for a low-molecular, substituted for unsubstituted alkyl radical,
$D_5$ for a low-molecular alkyl radical,
$E_5$ for a low-molecular alkyl radical,
$G_5$ for a hydrogen atom or a substituted or unsubstituted alkyl or alkoxy radical,
X for a low-molecular, substituted or unsubstituted alkyl radical, preferably the methyl group, and
$Y_5$ for COO or $SO_2$.

All the alkyl radicals can be saturated or unsaturated, branched or unbranched. The alkyl radicals $D_5$ and $E_5$ can form a saturated ring which may contain further hetero atoms in addition to the N atom shown in the formula. These dyes yield red to blue dyeings.

The dyes (VI) have the formula

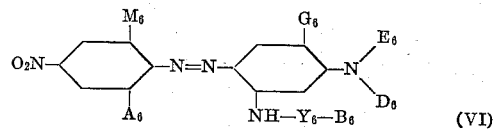
(VI)

In this
$A_6$ stands for a hydrogen, chlorine or bromine atom,
$B_6$ for a low-molecular, substituted or unsubstituted alkyl radical,
$D_6$ for a low-molecular alkyl radical,
$E_6$ for a low-molecular alkyl radical,
$G_6$ for a chlorine or bromine atom,
$M_6$ for a cyano, nitro, trifluoromethyl or alkylsulphonyl group, preferably the methylsulphonyl group, and
$Y_6$ for —CO—, —COO— or —$SO_2$—.

All the alkyl radicals can be saturated or unsaturated, branched or unbranched. The alkyl radicals $D_6$ and $E_6$ can form a saturated ring which may contain further hetero atoms in addition to the N atom shown in the formula.

In the formula

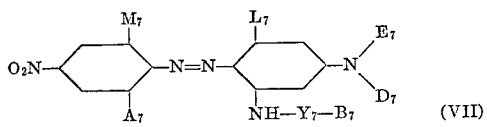

$A_7$ stands for a hydrogen, chlorine or bromine atom,
$B_7$ for a low-molecular, substituted or unsubstituted alkyl radical,
$D_7$ for a low-molecular alkyl radical,
$E_7$ for a low-molecular alkyl radical,
$L_7$ for a low-molecular alkanoylamino group having preferably 1 to 3 carbon atoms in the alkyl radical,
$M_7$ for a cyano, nitro, trifluoromethyl or alkylsulphonyl group, preferably a methylsulphonyl group, and
$Y_7$ for —CO—.

All the alkyl radicals can be saturated or unsaturated, branched or unbranched. The alkyl radicals $D_7$ and $E_7$ can form a saturated ring which may contain further hetero atoms in addition to the N atom shown in the formula.

In the formula

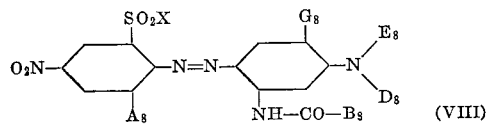

$A_8$ stands for a hydrogen, chlorine or bromine atom,
$B_8$ for a negatively substituted, low-molecular alkyl radical, preferably an alkyl radical having 1 to 3 carbon atoms and substituted by halogen, cyano, acyl or alkoxy,
$D_8$ for a low-molecular alkyl radical,
$E_8$ for a low-molecular alkyl radical,
$G_8$ for a hydrogen atom or a substituted or unsubstituted alkyl or alkoxy radical and
X for a low-molecular, substituted or unsubstituted alkyl radical, preferably the methyl group.

All the alkyl radicals can be saturated or unsaturated, branched or unbranched. The alkyl radicals $D_8$ and $E_8$ can form a saturated ring which may contain further hetero atoms in addition to the adjacent N atom shown in the formula. The dyes of the Formula VIII yield violet to blue dyeings.

In the formula

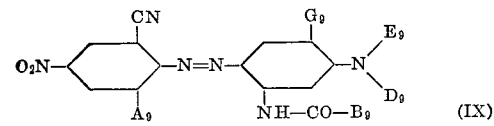

$A_9$ stands for a chlorine or bromine atom,
$B_9$ for a substituted or unsubstituted alkyl radical, preferably the methyl, chloromethyl, ethyl or β-chloroethyl radical,
$D_9$ for an alkyl radical having 1 to 4 carbon atoms,
$E_9$ for an alkyl radical having 1 to 4 carbon atoms and
$G_9$ for a substituted or unsubstituted alkyl or alkoxy radical.

All the alkyl radicals can be saturated or unsaturated, branched or unbranched. The alkyl radicals $D_9$ and $E_9$ can form a saturated ring which may contain further hetero atoms in addition to the N atom shown in the formula.

In the formula

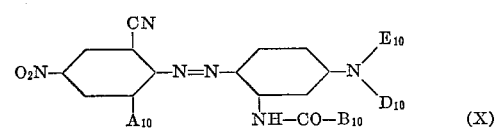

$A_{10}$ represents a chlorine or bromine atom,
$B_{10}$ a substituted or unsubstituted alkyl radical, preferably the methyl, chloromethyl, ethyl or β-chloroethyl radical,
$D_{10}$ an alkyl radical having 1 to 4 carbon atoms, preferably 1 to 2 carbon atoms and
$E_{10}$ an alkyl radical having 1 to 4 carbon atoms, preferably 1 to 2 carbon atoms.

The alkyl radicals can be saturated or unsaturated, branched or unbranched. In all the Formulae I to X the alkyl radicals B, D, E, G and X, the alkoxy radicals G and the alkylsulphonyl radicals M contain, in general, 1 to 4 or preferably 1 to 2 carbon atoms.

All of these dyes are produced by coupling the diazo component represented in the left-hand moiety of the Formulae I to X with the azo component represented in the right-hand moiety of the same formulae, which couples in para position to the tertiary amino group.

Dyestuff (I) is produced by coupling a diazotized amine of the formula

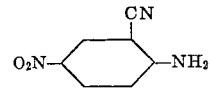

with a compound of the formula

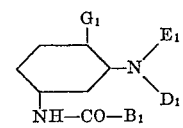

Dyestuff (II) is produced by coupling a diazotized amine of the formula

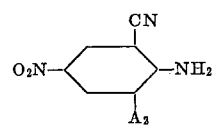

with a compound of the formula

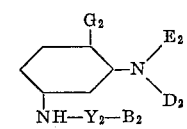

Dyestuff (III) is produced by coupling a diazotized amine of the formula

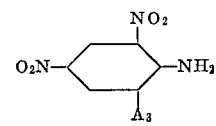

with a compound of the formula

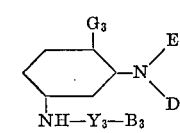

Dyestuff (IV) is produced by coupling a diazotized amine of the formula

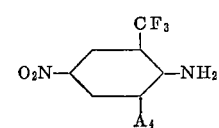

with a compound of the formula

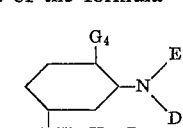

Dyestuff (V) is produced by coupling a diazotized amine of the formula

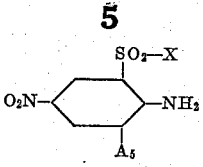

with a compound of the formula

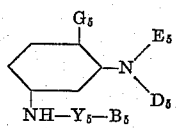

Dyestuff (VI) is produced by coupling a diazotized amine of the formula

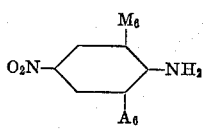

with a compound of the formula

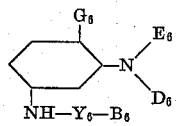

Dyestuff (VII) is produced by coupling a diazotized amine of the formula

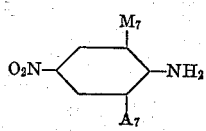

with a compound of the formula

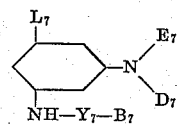

Dyestuff (VIII) is produced by coupling a diabotized amine of the formula

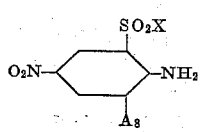

with a compound of the formula

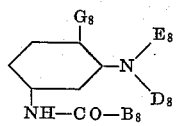

Dyestuff (IX) is produced by coupling a diazotized amine of the formula

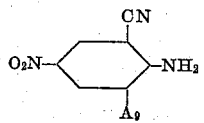

with a compound of the formula

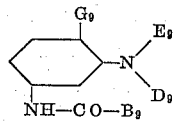

Dyestuff (X) is produced by coupling a diazotized amine of the formula

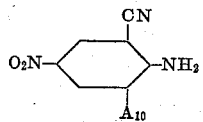

with a compound of the formula

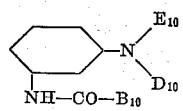

In general, the coupling reaction is conducted in an acid, if necessary buffered, medium with cooling, for example at temperatures of 0° to 5° C.

It is of great advantage to convert the dyes into dyeing preparations by one of the known methods before they are applied to the textile material. For this purpose they are ground to an average particle size of approximately 0.01 to 10 microns or preferably about 0.1 to 5 microns. Grinding can be carried out in the presence of dispersing agents or filling agents. For example, the dried dye can be ground with a dispersing agent, if necessary in the presence of filling agents or it can be kneaded in paste form with a dispersing agent and dried in a vacuum or jet drier. The preparations obtained in this way, on the addition of a suitable volume of water, are useful for dyeing from so-called long baths, for padding or for printing.

For dyeing in long baths amounts of dye up to about 100 grammes per liter are generally used, for padding up to about 150 grammes per liter, or preferably 0.1 to 100 grammes and for printing up to about 150 grammes per kilogramme of printing paste. The liquor ratio can vary within wide limits, e.g. from about 1:3 to 1:200 or preferably between 1:3 and 1:80.

Applied from aqueous dispersion, the dyes build up excellently on textile materials made of fully synthetic or semi-synthetic hydrophobic high-molecular substances. They are especially suitable for the dyeing, padding and printing of filaments, fibers, fleeces, knitted fabrics and woven fabrics made of linear aromatic polyesters, secondary cellulose acetate, or cellulose triacetate. Synthetic polyamides, polyolefins and acrylonitrile polymerisation products can also be dyed with the dyes. Dyeings of high quality are obtained on linear aromatic polyesters. These are generally polycondensation products of terephthalic acid and glycols, notably ethylene glycol, and are sold under various registered trade names, among which may be mentioned "Terylene," "Diolen" and "Dacron."

The known dyeing methods are used for the dyes. Polyester fibers can be dyed in the presence of carriers at temperatures from about 80° to 125° C. or in the absence of carriers at about 100° to 140° C. under pressure by the exhaustion process. The dyes can be padded on these fibres from aqueous dispersion or printed with an aqueous paste, and fixed at temperatures between 140° C. and 230° C., e.g. with the aid of water vapour or air. In the optimum temperature range 180° to 220° C. the dyes diffuse rapidly into the polyester fibre and do not sublime even when the fibre is exposed to these high temperatures for some length of time. This eliminates the inconvenience caused by contamination of the fixing plant by sublimed dye. Secondary cellulose acetate is dyed preferably at temperatures between about 65° and 80° C. and cellulose triacetate at temperatures up to about 115° C. The optimum pH range is 2 to 9 or more particularly 4 to 8.

In most cases one of the dispersing agents in general use is added to the dye-bath; these are preferably anionic or non-ionic and may be employed in mixture with each other. Approximately 0.5 gramme dispersing agent per litre of the dyeing medium is often sufficient, but larger amounts, e.g. to about 3 grammes per litre, can be used. Amounts in excess of 5 grammes do not usually offer any additional advantage. Known anionic dispersing agents which can be chosen for use in the process are, for example, particular dinaphthylmethane disulphonates, the esters of sulphonated succinic acid, Turkey red oil, the alkaline salts of the sulphuric acid esters of fat alcohols, e.g. sodium lauryl sulphate, sodium cetyl sulphate, dried sulphite cellulose waste liquor or its alkaline salts, soaps, and alkali sulphates of the monoglycerides of fat acids. Examples of known and especially suitable non-ionic dispersing agents are the addition products of approximately 3–40 moles of ethylene oxide and alkyl phenols, fat alcohols or fat amines, and their neutral sulphuric acid esters.

In padding and printing the standard thickening agents are used, e.g. modified or unmodified natural products such as sodium alginates, British gum, gum Arabic, crystal gum, locust bean gum, gum tragecanth, carboxy-methyl cellulose, hydroxy ethyl cellulose, starches; or synthetic thickening agents, e.g. polyacrylamides or polyvinylalcohols.

The dyeings and prints obtained are extremely fast to heat setting, sublimation, pleating, gas fumes, cross dyeing, dry cleaning, chlorine, and to wet treatments, e.g. water, washing and perspiration. They are well dischargeable and the reserve of cotton and wool is good. The light fastness is outstanding even in pale shades, which makes the new dyes highly suitable as components for combination dyeings in fashionable pastel shades. The dyes are stable to boiling and reduction at temperatures up to 220° C. and in particular within the range 80° to 140° C. This stability is not adversely affected either by the liquor ratio or by the presence of agents accelerating the dyeing process.

The blue dyes, in combination with small amounts of red dyes, are suitable for the production of inexpensive navy blue dyeings which are fast to light, washing, perspiration, chlorine, sublimation, pleating and heat setting, and dischargeable. In combination with red and yellow dyes they serve for the production of fast black dyeings.

In the following examples the parts and percentages are by weight and the temperatures in degrees centigrade.

*Example 1*

6.9 parts of powdered sodium nitrite are added slowly with stirring to 150 parts of concentrated sulphuric acid at 60–70°. Stirring is continued for 10 minutes at 60°, the soluiton cooled to 0° and 19.7 parts of 2-amino-3-chloro-5-nitrobenzonitrile added at this temperature. After a further 2 hours' stirring, the resulting diazonium salt solution is run into a cold mixture of 25 parts of 3-diethylamino-4-ethoxy-1-acetylaminobenzene, 20 parts of concentrated hydrochloric acid, 20 parts of ice and 10 parts of aminosulphonic acid.

The coupling reaction is brought to an end in an acid medium at 0° which may be buffered if necessary. The dye formed is filtered off, washed free of acid and dyed. The pure dye melts at 203°. In dimethyl formamide solution its absorption maximum is at 649 millimicrons.

*Example 2*

6.9 parts of powdered sodium nitrite are added slowly with stirring to 120 parts of concentrated sulphuric acid at 60–70°. Stirring is continued for 10 minutes at 60°, and after cooling to 15° 100 parts of glacial acetic acid followed by 20.6 parts of 2-trifluoromethyl-4-nitroaniline and 100 parts of glacial acetic acid are added at 15–25°. After another 2 hours' constant stirring the diazonium salt solution thus obtained is run on to 350 parts of ice. Excess nitrite is destroyed by the addition of amino-sulphonic acid. To the cold diazonium salt solution is added a mixture of 20.6 parts of 3-diethylamino-1-acetylaminobenzene. The coupling reaction is completed at 0°. The dye formed is then filtered off, washed free of acid and dried. Upon recrystallisation from ethanol and acetone it melts at 174°. It dyes synthetic fibres in brilliant bluish red shades which have good fastness properties.

*Example 3*

6.9 parts of powdered sodium nitrite are added slowly with stirring to 150 parts of concentrated sulphuric acid at 60–70°. After stirring for a further 10 minutes at 60° the solution is cooled to 0° and at this temperature 26.2 parts of 2,4-dinitro-6-bromoaniline are added. Stirring is continued for 2 hours and the resulting diazonium salt solution run into a cold mixture of 25 parts of 3-diethylamino-4-ethoxy-1-acetylaminobenzene, 20 parts of concentrated hydrochloric acid, 20 parts of ice and 10 parts of aminosulphonic acid. The coupling reaction is brought to a close at 0° in acid medium. The dye formed is filtered off, washed free of acid and dried. The pure dye melts at 195°.

*Example 4*

6.9 parts of sodium nitrite are added slowly with vigorous stirring to 120 parts of concentrated sulphuric acid at 60–70°. After 10 minutes stirring at 60° the temperature is brought down to 10° and 16.3 parts of 2-amino-5-nitrobenzonitrile are added at this temperature. After 3 hours diazotisation is completed. The sulphuric acid diazonium salt solution is run into a mixture of 23.6 parts of 3-diethylamino-1-carbethoxyaminobenzene, 80 parts of glacial acetic acid, 150 parts of ice and 10 parts of aminosulphonic acid. The coupling reaction is completed in a buffered medium at 0°. The dye is filtered off with suction, washed free of acid, dried, and recrystallised from acetone solution. It then melts at 156°. It dyes synthetic fibres in brilliant reddish violet shades having good fastness properties.

*Example 5*

6.9 parts of sodium nitrite are added slowly with stirring to 120 parts of concentrated sulphuric acid at 60–70°. After stirring for another 10 minutes at 60° the solution is cooled to 10° and 100 parts of glacial acetic acid followed by 19.7 parts of 2-amino-3-chloro-5-nitrobenzonitrile and 100 parts of glacial acetic acid are added at 10–20°. Stirring is continued for 2 hours, then 10 parts of urea are added to the diazonium salt solution and after 10 minutes it is run into a cold mixture of 23.6 parts of 3-diethylamino-1-carbethoxyaminobenzene, 20 parts of concentrated hydrochloric acid and 100 parts of ice. The coupling reaction is brought to a close in acid medium at 0°. The dye formed is filtered off, washed free of acid and dried. It can be recrystallised from solution in monochlorobenzene. The pure dye melts at 210°. It dyes synthetic fibres in volet shades with good fastness properties. Its absorption maximum in dimethyl formamide solution is at 578 millimicrons.

*Example 6*

6.9 parts of powdered sodium nitrite are added slowly with vigorous stirring to 120 parts of concentrated sulphuric acid at 60–70°. After stirring for another 10 minutes at 60° the solution is cooled to 10° and 100 parts of glacial acetic acid, 16.3 parts of 2-amino-5-nitrobenzonitrile and 100 parts of glacial acetic acid are added successively at 10–20°. Stirring is continued for 2 hours, then the resulting diazonium salt solution is poured into a mixture of 23.4 parts of 3-diethylamino-4-methyl-1-propionylaminobenzene, 100 parts of glacial acetic acid, 150 parts of ice and 10 parts of aminosulphonic acid. The coupling reaction is completed in a buffered medium. The dye formed is filtered off, washed free of acid, dried, and if desired recrystallised from acetone solution. The pure dye melts at 154°. It dyes synthetic fibres in violet shades which have good fastness properties.

*Example 7*

6.9 parts of powdered sodium nitrite are added with vigorous stirring to 120 parts of concentrated sulphuric acid at 60–70°. After stirring for a further 10 minutes at 60°, the solution is cooled to 10° and 100 parts of glacial acetic acid, 16.3 parts of 2-amino-5-nitrobenzonitrile and 100 parts of glacial acetic acid are added successively at 10–20°. Stirring is continued for 2 hours, then the diazonium salt solution formed is run into a mixture of 24 parts of 3-diethylamino-1-chloroacetylaminobenzene, 20 parts of concentrated hydrochloric acid, 100 parts of ice and 10 parts of aminosulphonic acid. The coupling reaction is completed at 0° in acid medium. The dye formed is filtered off, washed free of acid with water, and dried. The dried dye can be recrystallised from solution in chlorobenzene. The pure dye melts at 202°. It dyes synthetic fibres in brilliant violet shades which have very good fastness properties.

*Example 8*

6.9 parts of sodium nitrate are added slowly with vigorous stirring to 140 parts of concentrated sulphuric acid at 60–70°. Stirring is continued for 10 minutes at 60° and after cooling to 10° 26.2 parts of 2.4-dinitro-6-bromoaniline are added. After 3 hours diazotisation is completed. 8 parts of urea are added and stirring continued for 15 minutes at 10°. The resultant diazonium salt solution is poured into a cold mixture of 23.6 parts of 3-diethylamino-1-carbethoxyaminobenzene, 50 parts of glacial acetic acid and 100 parts of ice. The coupling reaction is brought to a close in a buffered medium. The dye is filtered off, washed free of acid and dried, and can be recrystallised from solution in ethanol and acetone. The pure dye melts at 152°. It dyes synthetic fibres in brilliant violet shades.

*Example 9*

6.9 parts of sodium nitrite are added slowly with thorough stirring to 150 parts of concentrated sulphuric acid at 60–70°, and stirring is continued for 10 minutes at 60°. After cooling to 10° 18.3 parts of 2,4-dinitroaniline are added, stirring continued for 3 hours at 10°, and the sulphuric acid diazonium salt solution then run into a mixture of 800 parts of ice, 200 parts of water and 10 parts of aninosulphonic acid. The solution thus formed is filtered and 24 parts of 3-diethylamino-1-chloroacetylaminobenzene are added at 0°. The coupling reaction is completed in acid medium. The dye formed is filtered off, washed free of acid and dried. The pure die melts at 194°. It dyes synthetic fibres in brilliant violet shades.

*Example 10*

6.9 parts of powdered sodium nitrite are added with vigorous stirring to 150 parts of concentrated sulphuric acid at 60–70°, stirring continued for 10 minutes at 60°, and the temperature brought down to 10°, upon which 50 parts of glacial acetic acid, 26.2 parts of 2,4-dinitro-6-bromoaniline and 50 parts of glacial acetic acid are added successively at 10–20°. After a further 2 hours stirring the diazonium salt solution is run into a mixture of 23.4 parts of 3-diethylamino-4-methyl-1-propionylaminobenzene, 100 parts of glacial acetic acid, 100 parts of ice and 10 parts of aminosulphonic acid. The coupling reaction is brought to completion in acid medium at 0° which may be buffered if necessary. The dye obtained is filtered off, washed free of acid and crystallised from acetone solution to determine its melting point. The pure dyes melts at 170°. It dyes synthetic fibres in blue shades.

*Example 11*

6.9 parts of powrered sodium nitrite are added slowly with vigorous stirring to 120 parts of concentrated sulphuric acid at 60–70°. Stirring is continued for 10 minutes at 60°, the solution then cooled to 10°, and 100 parts of glacial acetic acid, 28.5 parts of 2-trifluoromethyl-4-nitro-6-bromoaniline and 100 parts of acetic acid added successively at 10–20°. After stirring for 2 hours 8 parts of urea are added, and after a further 10 minutes the diazonium salt solution is run into a mixture of 20.6 parts of 3-diethylamino-1-acetylaminobenzene, 50 parts of glacial acetic acid and 100 parts of ice. The coupling reaction is completed in a buffered medium. The dye formed is filtered off and washed free of acid with water. It can be recrystallised from acetone. The pure dye melts at 171° and dyes synthetic fibres in violet shades.

*Example 12*

6.9 parts of powdered sodium nitrite are added slowly with stirring to 120 parts of concentrated sulphuric acid at 60–70°, stirring continued for 10 minutes at 60°, the mixture cooled to 15°, and 100 parts of glacial acetic acid, 20.6 parts of 2-trifluoromethyl-4-nitroaniline and 100 parts of glacial acetic acid added in that order at 15–20°. After stirring for a further 2 hours the resulting diazonium salt solution is poured onto 400 parts of ice. Excess nitrite is destroyed by the addition of aminosulphonic acid. To the ice-cold diazonium salt solution is added a mixture of 25 parts of 3-diethylamino-4-ethoxy-1-acetylaminobenzene and 20 parts of concentrated hydrochloric acid. The coupling reaction is finalised in acid medium at 0° which may be buffered if necessary. The dye obtained is filtered off, washed free of acid and dried. The pure dye melts at 183° and dyes synthetic fibres in blue shades.

*Example 13*

6.9 parts of powdered sodium nitrite are added slowly with vigorous stirring to 120 parts of concentrated sulphuric acid at 60–70°, stirring continued for 10 minutes at 60°, the mixture cooled to 10° and 20.6 parts of 2-trifluoromethyl-4-nitroaniline added. Stirring is continued for 2 hours, 8 parts of urea are added, and after 10 minutes the resulting diazonium salt solution is run into a mixture of 23.6 parts of 3-diethylamino-1-carbethoxyaminobenzene, 20 parts of concentrated hydrochloric acid and 100 parts of ice. The coupling reaction is completed in acid medium at 0°. The dye obtained is filtered off, washed free of acid and dried. On recrystallisation from ethanol solution it melts at 156°. It dyes synthetic fibres in red shades with good fastness properties.

*Example 14*

6.9 parts of powdered sodium nitrite are added slowly with stirring to 120 parts of concentrated sulphuric acid at 60–70°, stirring continued for 10 minutes at 60°, the mixture cooled to 10° and 20.6 parts of 2-trifluoromethyl-4-nitroaniline added. After stirring for another 2 hours the diazonium salt solution is poured onto 400 parts of ice, and the excess nitrite destroyed by the addition of 5 parts of aminosulphonic acid. To the cold diazonium salt solution is added a mixture of 23.4 parts of 3 - diethylamino - 4 - methyl-1-propionylaminobenzene and 100 parts of glacial acetic acid. The coupling reaction is brought to a close in acid medium which may be buffered if necessary. The dye obtained is filtered off, washed with water until free of acid and dried. The dry dye can be recrystallised from acetone. The pure dye melts at 150° and dyes synthetic fibres in red shades.

*Example 15*

6.9 parts of powdered sodium nitrite are added slowly with thorough stirring to 120 parts of concentrated sulphuric acid to 60–70°, stirring continued for 10 minutes at 60°, the mixture cooled to 10° and 100 parts of glacial acetic acid, 21.6 parts of 1-amino-2-methylsulphonyl-4-nitrobenzene and 100 parts of glacial acetic acid added consecutively at 15–25°. After stirring for a further 2 hours at 10° 8 parts of urea are added. The resulting diazonium salt solution is poured into a mixture of 23.6 parts of 3-diethylamino-1-carbethoxyaminobenzene, 20 parts of concentrated hydrochloric acid and 150 parts of ice, and the coupling reaction completed in buffered medium. The precipitated dye is filtered off, washed and dried. After recrystallisation once from chlorobenzene solution it melts at 185°. The dye dyes synthetic fibres in brilliant violet shades with very good fastness properties.

Example 16

6.9 parts of powdered sodium nitrite are added with vigorous stirring to 150 parts of concentrated sulphuric acid at 60–70°, and after 10 minutes 25 parts of 1-amino-2-methylsulphonyl-4-nitro-6 - chlorobenzene are added. Stirring is continued for 1 hour at 60° and the mixture then cooled to 0°. The diazonium salt solution formed is run into a mixture of 23.6 parts of 3-diethylamino-1-carbethoxyaminobenzene, 100 parts of glacial acetic acid and 100 parts of ice. The coupling reaction is completed at 0° in an acid, if necessary buffered medium. The dye obtained is filtered off, washed with water until free of acid and dried. The pure dye melts at 181° and dyes synthetic fibres in violet shades.

Example 17

6.9 parts of sodium nitrite are added slowly with thorough stirring to 150 parts of concentrated sulphuric acid at 60–70°. Stirring is continued for 10 minutes at 60° and the mixture cooled to 10°. Then 21.6 parts of powdered 1-amino-2-methylsulphonyl - 4 - nitrobenzene are added, stirring continued for 2 hours at 10° and the resulting diazonium salt solution run into a mixture of 700 parts of ice and 8 parts of aminosulphonic acid. A solution of 24.2 parts of 3-diethylamino-1-methylsulphonylaminobenzene in 100 parts of glacial acetic acid is added to the ice-cold diazonium salt solution which is then neutralised with sodium acetate. The coupling reaction is completed and precipitated dye is filtered off, washed and dried. It can be recrystallised from dioxan. The pure dye melts at 223° and dyes synthetic fibres in violet shades which have good fastness properties.

Example 18

6.9 parts of powdered sodium nitrite are added slowly with stirring to 150 parts of concentrated sulfuric acid at 60–70°. After stirring for a further 10 minutes at 60° and cooling to 0°, 21.7 parts of 2,4-dinitro-6-chloroaniline are added, stirring continued for 2 hours, and the resulting diazonium salt solution run into a cold mixture of 25 parts of 3-diethylamino-4-methoxy - 1 - propionylaminobenzene, 20 parts of concentrated hydrochloric acid, 50 parts of ice and 10 parts of aminosulfonic acid. The coupling reaction is brought to a close in buffered medium. The precipitated dye is filtered off, washed and dried. It dyes synthetic fibres in greenish blue shades.

Example 19

6.9 parts of sodium nitrite are added slowly with thorough stirring to 140 parts of concentrated sulfuric acid at 60–70°. Stirring is continued for 10 minutes at 60°, the mixture cooled to 10° and 26.2 parts of 2,4-dinitro-6-bromoaniline added. After 3 hours diazotisation is complete. 8 parts of urea are added, stirring continued for 15 minutes at 10° and the resulting diazonium salt solution poured into a cold mixture of 25 parts of 3-diethylamino-4-methoxy-1-propionylaminobenzene, 50 parts of glacial acetic acid and 100 parts of ice. The coupling reaction is terminated in buffered medium. The dye is filtered off, washed free of salt and dried. It can be recrystallized from solution in acetone and dioxan. The pure dye melts at 191°. It dyes synthetic fibres in brilliant greenish blue shades.

Example 20

6.9 parts of powdered sodium nitrite are added slowly with vigorous stirring to 150 parts of concentrated sulfuric acid at 60–70°, stirring continued for 10 minutes at 60°, the mixture cooled at 10°, and 50 parts of glacial acetic acid, 21.7 parts of 2,4-dinitro-6-chloroaniline and 50 parts of glacial acetic acid added consecutively at 10–20°. Stirring is continued for 2 hours and the diazonium salt solution formed then run into a mixture of 25 parts of 3-diethylamino-4-ethoxy-1-acetylaminobenzene, 100 parts of glacial acetic acid, 100 parts of ice and 10 parts of aminosulfonic acid. The coupling reaction is brought to a close in acid medium at 0° which may be buffered. The dye formed is filtered off, washed free of acid and dried. It dyes synthetic fibres in greenish blue shades.

Example 21

6.9 parts of sodium nitrite are added slowly with good stirring to 140 parts of concentrated sulfuric acid at 60–70°. After stirring for another 10 minutes and cooling to 10°, 26.2 parts of 2,4-dinitro-6-bromoaniline are added. After 3 hours diazotisation is complete. 8 parts of urea are added with continued stirring for 15 minutes at 10°. The diazonium salt solution obtained is run into a cold mixture of 26.4 parts of 3-diethylamino-4-ethoxy-1-propionylaminobenzene, 100 parts of glacial acetic acid and 150 parts of ice. The coupling reaction is brought to a close in buffered medium. The precipitated dye is filtered off, washed and dried. It dyes synthetic fibres in greenish blue shades.

Example 22

6.9 parts of powdered sodium nitrite are added slowly with vigorous stirring to 150 parts of concentrated sulfuric acid at 60–70°. After stirring for a further 10 minutes at 60–70° and cooling to 0°, 24.2 parts of 2-amino-3-bromo-5-nitrobenzonitrile are added and stirring continued for 2 hours. Then the resulting diazonium salt solution is run into a cold mixture of 25 parts of 3-diethylamino-4-ethoxy-1-acetylaminobenzene, 20 parts of concentrated hydrochloric acid, 20 parts of ice and 10 parts of aminosulfonic acid.

The coupling reaction is completed in acid, if necessary buffered, medium at 0°. The dye formed is filtered off, washed free of acid and dried. In the pure state it melts at 220°. Its absorption maximum in dimethyl formamide solution is at 650 millimicrons.

Example 23

6.9 parts of powdered sodium nitrite are added slowly with thorough stirring to 120 parts of concentrated sulfuric acid at 60–70°. After stirring for another 10 minutes at 60° and cooling to 10°, 100 parts of glacial acetic acid are added at 15–25°, followed by 25 parts of 1-amino-2-methylsulfonyl-4-nitrobenzene and 100 parts of glacial acetic acid. Stirring is continued for 2 hours at 10°, then 8 parts of urea are added. After 10 minutes the diazonium salt solution is poured into a mixture of 24 parts of 3-diethylamino - 1 - chloroacetylaminobenzene, 20 parts of concentrated hydrochloric acid and 150 parts of ice. The coupling reaction is completed at 0° in acid medium. The dye formed is filtered off, washed free of acid and dried. It can be recrystallised from acetone and dioxan. The pure dye melts at 210°. It dyes synthetic fibres in brilliant violet shades with good fastness properties.

Example 24

6.9 parts of sodium nitrite are added slowly with good stirring to 120 parts of concentrated sulfuric acid at 60–70°. After stirring for another 10 minutes at 60° and cooling to 10°, 16.3 parts of 2-amino-5-nitrobenzonitrile are added at this temperature. After 3 hours diazotisation is complete. The sulfuric acid diazonium salt solution is poured into a mixture of 24.2 parts of 3-diethylamino-1-methylsulfonylaminobenzene, 80 parts of glacial acetic acid, 150 parts of ice and 10 parts of aminosulfonic acid. The coupling reaction is brought to a close at 0° in buffered medium. The dye is filtered off with suction, washed free of acid, dried and recrystallised from dioxan. It melts at 170.5° and dyes synthetic fibres in brilliant violet shades having good fastness properties.

Example 25

6.9 parts of powdered sodium nitrite are added slowly with vigorous stirring to 150 parts of concenrtated sulfuric acid at 60–70°. After stirring for a further 10 minutes at 60° and cooling to 0°, 19.7 parts of 2-amino-3-chloro-5-nitrobenzonitrile are added at this temperature. Stirring is continued for 2 hours and the resulting diazonium salt solution is run into a cold mixture of 24.2 parts of 3-diethylamino-1-methylsulfonylaminobenzene, 20 parts of concentrated hydrochloric acid, 150 parts of ice and 10 parts of aminosulfonic acid. The coupling reaction is brought to a close in acid medium at 0° which may be buffered. The dye formed is filtered off, washed free of acid and dried. After recrystallisation once from chlorobenzene it melts at 216.5°. On synthetic fibres it yields brilliant violet shades with good fastness properties.

The dyestuffs listed in the following tables are produce in the same manner as given in the preceding examples.

TABLE 1.—DYES OF FORMULA I

| Example No. | $B_1$ | $D_1$ | $E_1$ | $G_1$ | Shade on Polyester Fibers |
|---|---|---|---|---|---|
| 26 | —CH$_2$CN | —C$_2$H$_5$ | —C$_2$H$_5$ | H | Violet. |
| 27 | —CF$_3$ | —C$_2$H$_5$ | —C$_2$H$_5$ | H | Do. |
| 28 | —CH$_3$ | —C$_2$H$_5$ | —C$_2$H$_5$ | —CH$_3$ | Do. |
| 29 | —CH$_2$—O— 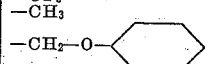 | —C$_2$H$_5$ | —C$_2$H$_5$ | H | Do. |
| 30 | —C—(CH$_3$)$_3$ | —C$_2$H$_5$ | —C$_2$H$_5$ | H | Do. |
| 31 | —CH$_2$—O—C$_2$H$_5$ | —C$_2$H$_5$ | —C$_2$H$_5$ | H | Do. |
| 32 | —CH$_3$ | —C$_2$H$_5$ | —C$_2$H$_5$ | —OC$_2$H$_5$ | Do. |
| 33 | —CH$_2$Cl | —C$_2$H$_5$ | —C$_2$H$_5$ | H | Do. |
| 34 | —CH$_2$Br | —C$_2$H$_5$ | —C$_2$H$_5$ | —OC$_2$H$_5$ | Do. |

TABLE 2.—DYES OF FORMULA II

| Ex. No. | $A_2$ | $B_2$ | $D_2$ | $E_2$ | $G_2$ | $Y_2$ | Shade on Polyester Fibers |
|---|---|---|---|---|---|---|---|
| 35 | Cl | —CH$_3$ | —CH$_3$ | —CH$_3$ | H | —COO— | Blue. |
| 36 | Cl | —C$_2$H$_5$ | —CH$_3$ | —CH$_3$ | H | —COO— | Do. |
| 37 | Cl | —C$_2$H$_4$Br | —C$_2$H$_5$ | —C$_2$H$_5$ | H | —COO— | Do. |
| 38 | Cl | —C$_2$H$_5$ | —C$_2$H$_5$ | —C$_2$H$_5$ | —OCH$_3$ | —CCO— | Greenish Blue. |
| 39 | Br | —C$_2$H$_5$ | —C$_2$H$_5$ | —C$_2$H$_5$ | —OC$_2$H$_5$ | —COO— | Do. |
| 40 | Br | —C$_2$H$_5$ | —C$_2$H$_5$ | —C$_2$H$_5$ | —CH$_3$ | —COO— | Do. |
| 41 | Cl | —CH$_3$ | —C$_2$H$_5$ | —C$_2$H$_5$ | H | —SO$_2$— | Blue. |
| 42 | Br | —CH$_3$ | —CH$_3$ | —CH$_3$ | H | —SO$_2$— | Do. |
| 43 | Br | —CH$_3$ | —CH$_3$ | —CH$_3$ | OC$_2$H$_5$ | —SO$_2$— | Do. |
| 44 | Br | —CH$_3$ | —C$_2$H$_5$ | —C$_2$H$_5$ | —CH$_3$ | —SO$_2$— | Do. |
| 45 | H | —C$_2$H$_5$ | —C$_3$H$_7$ | —C$_3$H$_7$ | H | —COO— | Violet. |
| 46 | H | —C$_2$H$_5$ | —C$_2$H$_5$ | —C$_2$H$_5$ | —OC$_2$H$_5$ | —COO— | Do. |
| 47 | H | —C$_2$H$_5$ | —C$_2$H$_5$ | —C$_2$H$_5$ | —CH$_3$ | —COO— | Do. |
| 48 | H | —CH$_3$ | —C$_3$H$_7$ | —C$_3$H$_7$ | H | —SO$_2$— | Do. |
| 49 | H | —CH$_3$ | —C$_2$H$_5$ | —C$_2$H$_5$ | —OC$_2$H$_5$ | —SO$_2$— | Do. |
| 50 | H | —CH$_3$ | —C$_2$H$_5$ | —C$_2$H$_5$ | H | —SO$_2$— | Do. |
| 51 | H | —CH$_3$ | —C$_2$H$_5$ | —C$_2$H$_5$ | H | —SO$_2$— | Do. |
| 52 | H | —CH$_3$ | —C$_2$H$_5$ | —C$_2$H$_5$ | H | —SO$_2$— | Do. |
| 53 | H | —CH$_3$ | —C$_2$H$_5$ | —C$_2$H$_5$ | —OC$_2$H$_5$ | —SO$_2$— | Do. |
| 54 | H | —C$_2$H$_4$Cl | —C$_2$H$_5$ | —C$_2$H$_5$ | H | —COO— | Do. |

TABLE 3.—DYES OF FORMULA III

| Ex. No. | $A_3$ | $B_3$ | $D_3$ | $E_3$ | $G_3$ | $Y_3$ | Shade on Polyester Fibers |
|---|---|---|---|---|---|---|---|
| 55 | Cl | —CH$_3$ | —C$_2$H$_5$ | —C$_2$H$_5$ | —C$_2$H$_5$ | —CO— | Blue. |
| 56 | Cl | —C$_2$H$_5$ | —C$_2$H$_5$ | —C$_2$H$_5$ | —OC$_2$H$_5$ | —CO— | Do. |
| 57 | Cl | —CH$_3$ | —CH$_3$ | —CH$_3$ | H | —CO— | Do. |
| 58 | Cl | —C$_2$H$_5$ | —C$_2$H$_5$ | —C$_2$H$_5$ | H | —CO— | Do. |
| 59 | Cl | —C$_2$H$_5$ | —CH$_3$ | —CH$_3$ | H | —CO— | Do. |
| 60 | Br | —CH$_3$ | —C$_2$H$_5$ | —C$_2$H$_5$ | H | —CO— | Do. |
| 61 | Br | —CH$_3$ | —CH$_3$ | —CH$_3$ | H | —CO— | Do. |
| 62 | Br | —C$_2$H$_5$ | —C$_2$H$_5$ | —C$_2$H$_5$ | H | —CO— | Do. |
| 63 | Br | —C$_2$H$_5$ | —CH$_3$ | —CH$_3$ | H | —CO— | Do. |
| 64 | Cl | —CH$_3$ | —C$_3$H$_7$ | —C$_3$H$_7$ | H | —CO— | Do. |
| 65 | Br | —CH$_3$ | —C$_4$H$_9$ | —C$_4$H$_9$ | H | —CO— | Do. |
| 66 | Br | —CH$_3$ | —C$_2$H$_5$ | —C$_2$H$_5$ | —OCH$_3$ | —CO— | Greenish blue. |
| 67 | Br | —C$_2$H$_5$ | —C$_2$H$_5$ | —C$_2$H$_5$ | —OC$_2$H$_5$ | —CO— | Do. |
| 68 | Br | —CH$_3$ | —C$_2$H$_5$ | —C$_2$H$_5$ | —OC$_2$H$_5$ | —CO— | Do. |
| 69 | Br | —C$_2$H$_5$ | —C$_2$H$_5$ | —C$_2$H$_5$ | —OCH$_3$ | —CO— | Do. |
| 70 | Br | —C$_2$H$_5$ | —C$_2$H$_5$ | —C$_2$H$_5$ | —CH$_3$ | —CO— | Do. |
| 71 | Cl | —CH$_3$ | —CH$_3$ | —CH$_3$ | —C$_2$H$_5$ | —CO— | Do. |
| 72 | Cl | —CH$_3$ | —CH$_3$ | —CH$_3$ | H | —COO— | Reddish blue. |
| 73 | Cl | —C$_2$H$_5$ | —CH$_3$ | —CH$_3$ | H | —COO— | Do. |
| 74 | Br | —C$_2$H$_4$Cl | —C$_2$H$_5$ | —C$_2$H$_5$ | H | —COO— | Do. |
| 75 | Br | —C$_2$H$_5$ | —C$_2$H$_5$ | —C$_2$H$_5$ | —OCH$_3$ | —COO— | Blue. |
| 76 | Br | —C$_2$H$_5$ | —C$_2$H$_5$ | —C$_2$H$_5$ | —OC$_2$H$_5$ | —COO— | Do. |
| 77 | Cl | —CH$_3$ | —C$_2$H$_5$ | —C$_2$H$_5$ | —OC$_2$H$_5$ | —COO— | Do. |
| 78 | Br | —C$_2$H$_5$ | —C$_2$H$_5$ | —C$_2$H$_5$ | —CH$_3$ | —COO— | Do. |
| 79 | Br | —C$_2$H$_5$ | —C$_2$H$_5$ | —C$_2$H$_5$ | —C$_2$H$_5$ | —COO— | Do. |
| 80 | Br | —CH$_3$ | —C$_2$H$_5$ | —C$_2$H$_5$ | H | —SO$_2$— | Violet. |
| 81 | Br | —CH$_3$ | —CH$_3$ | —CH$_3$ | H | —SO$_2$— | Do. |
| 82 | Br | —CH$_3$ | —CH$_3$ | —CH$_3$ | —OC$_2$H$_5$ | —SO$_2$— | Blue. |
| 83 | Br | —CH$_3$ | —C$_2$H$_5$ | —C$_2$H$_5$ | —CH$_3$ | —SO$_2$— | Do. |
| 84 | Cl | —CH$_3$ | —C$_2$H$_5$ | —C$_2$H$_5$ | —C$_2$H$_5$ | —SO$_2$— | Do. |
| 85 | Cl | —CH$_2$Cl | —C$_2$H$_5$ | —C$_2$H$_5$ | H | —CO— | Do. |
| 86 | Br | —CH$_2$Br | —C$_2$H$_5$ | —C$_2$H$_5$ | H | —CO— | Do. |
| 87 | Cl | —CH$_2$Cl | —C$_2$H$_5$ | —C$_2$H$_5$ | —OC$_2$H$_5$ | —CO— | Do. |
| 88 | Cl | —CH$_2$Cl | —C$_2$H$_5$ | —C$_2$H$_5$ | CH$_3$ | —CO— | Do. |
| 89 | Br | —CH$_2$CN | —CH$_3$ | —CH$_3$ | —OC$_2$H$_5$ | —CO— | Do. |
| 90 | Cl | —CH$_3$ | —CH$_3$ | —CH$_3$ | H | —CO— | Do. |
| 91 | Br | —CH$_3$ | —CH$_3$ | —CH$_3$ | H | —SO$_2$— | Violet. |
| 92 | H | —CH$_3$ | —CH$_3$ | —CH$_3$ | H | —SO$_2$— | Do. |
| 93 | H | —C$_2$H$_5$ | —C$_2$H$_5$ | —C$_2$H$_5$ | —OC$_2$H$_5$ | —CO— | Do. |
| 94 | H | —C$_2$H$_4$Cl | —C$_2$H$_5$ | —C$_2$H$_5$ | H | —COO— | Do. |
| 95 | H | —CH$_3$ | —C$_2$H$_5$ | —C$_2$H$_5$ | H | —SO$_2$— | Do. |

TABLE 3.—Continued

| Ex. No. | $A_3$ | $B_3$ | $D_3$ | $E_3$ | $G_3$ | $Y_3$ | Shade on Polyester Fibers |
|---|---|---|---|---|---|---|---|
| 96 | H | $-C_2H_5$ | $-C_2H_5$ | $-C_2H_5$ | $-CH_3$ | $-CO-$ | Do. |
| 97 | H | $-C-(CH_3)_3$ | $-C_2H_5$ | $-C_2H_5$ | H | $-CO-$ | Do. |
| 98 | Cl | $-C-(CH_3)_3$ | $-C_2H_5$ | $-C_2H_5$ | H | $-CO-$ | Do. |
| 99 | Br | $-C-(CH_3)_3$ | $-C_2H_5$ | $-C_2H_5$ | H | $-CO-$ | Do. |
| 100 | H | $-CH_2-O-C_2H_5$ | $-C_2H_5$ | $-C_2H_5$ | H | $-CO-$ | Reddish blue. |
| 101 | Cl | $-CH_2-O-C_2H_5$ | $-C_2H_5$ | $-C_2H_5$ | H | $-CO-$ | Do. |
| 102 | Br | $-CH_2-O-C_2H_5$ | $-C_2H_5$ | $-C_2H_5$ | H | $-CO-$ | Do. |
| 103 | Br | $-CH(Cl)-O-\text{C}_6\text{H}_5$ | $-C_2H_5$ | $-C_2H_5$ | H | $-CO-$ | Do. |
| 104 | H | $-CH_2-O-\text{C}_6\text{H}_5$ | $-C_2H_5$ | $-C_2H_5$ | H | $-CO-$ | Reddish violet. |
| 105 | Cl | $-CH_2-O-\text{C}_6\text{H}_5$ | $-C_2H_5$ | $-C_2H_5$ | H | $-CO-$ | Reddish blue. |
| 106 | Br | $-CH_2-O-\text{C}_6\text{H}_5$ | $-C_2H_5$ | $-C_2H_5$ | H | $-CO-$ | Do. |
| 107 | Cl | $-CF_3$ | $-C_2H_5$ | $-C_2H_5$ | H | $-CO-$ | Blue. |

TABLE 4.—DYES OF FORMULA IV

| Ex. No. | $A_4$ | $B_4$ | $D_4$ | $E_4$ | $G_4$ | $Y_4$ | Shade on Polyester Fibers |
|---|---|---|---|---|---|---|---|
| 108 | Cl | $-CH_3$ | $-CH_3$ | $-CH_3$ | H | $-CO-$ | Reddish violet. |
| 109 | Br | $-C_2H_5$ | $-C_2H_5$ | $-C_2H_5$ | H | $-CO-$ | Do. |
| 110 | Br | $-CH_3$ | $-C_4H_9$ | $-C_4H_9$ | H | $-CO-$ | Do. |
| 111 | Br | $-CH_2Cl$ | $-C_2H_5$ | $-C_2H_5$ | H | $-CO-$ | Do. |
| 112 | Br | $-CH_2Br$ | $-CH_3$ | $-CH_3$ | H | $-CO-$ | Do. |
| 113 | Br | $-CHCl_2$ | $-CH_3$ | $-CH_3$ | H | $-CO-$ | Do. |
| 114 | Cl | $-CCl_3$ | $-CH_3$ | $-CH_3$ | H | $-CO-$ | Do. |
| 115 | Cl | $-CF_3$ | $-CH_3$ | $-CH_3$ | H | $-CO-$ | Do. |
| 116 | Cl | $-CF_3$ | $-C_3H_7$ | $-C_3H_7$ | H | $-CO-$ | Do. |
| 117 | Cl | $-CH_2CN$ | $-C_2H_5$ | $-C_2H_5$ | H | $-CO-$ | Do. |
| 118 | Cl | $-CH_2CH_2Cl$ | $-C_2H_5$ | $-C_2H_5$ | H | $-CO-$ | Do. |
| 119 | Cl | $-CHCl-CH_2Cl$ | $-C_2H_5$ | $-C_2H_5$ | $-OC_2H_5$ | $-CO-$ | Greenish blue. |
| 120 | Br | $-CH_3$ | $-CH_3$ | $-CH_3$ | $-CH_3$ | $-CO-$ | Do. |
| 121 | Cl | $-CH_3$ | $-C_2H_5$ | $-C_2H_5$ | H | $-SO_2-$ | Rubine. |
| 122 | H | $-CH_3$ | $-C_2H_5$ | $-C_2H_5$ | H | $-SO_2-$ | Violet. |
| 123 | Cl | $-CH_3$ | $-C_2H_5$ | $-C_2H_5$ | $-CH_3$ | $-SO_2-$ | Do. |
| 124 | Br | $-C_2H_5$ | $-C_2H_5$ | $-C_2H_5$ | $-OC_2H_5$ | $-SO_2-$ | Rubine. |
| 125 | Br | $-C_2H_5$ | $-CH_3$ | $-CH_3$ | H | $-SO_2-$ | Do. |
| 126 | H | $-C_2H_4Cl$ | $-CH_3$ | $-CH_3$ | H | $-SO_2-$ | Red. |
| 127 | H | $-C_2H_5$ | $-CH_3$ | $-CH_3$ | H | $-CO-$ | Violet. |
| 128 | H | $-C_2H_5$ | $-CH_3$ | $-CH_3$ | H | $-CO-$ | Reddish blue. |
| 129 | H | $-CH_3$ | $-CH_3$ | $-CH_3$ | H | $-CO-$ | Do. |
| 130 | H | $-CH_3$ | $-C_3H_7$ | $-C_3H_7$ | H | $-CO-$ | Rubine. |
| 131 | H | $-CH_3$ | $-C_4H_9$ | $-C_4H_9$ | H | $-COO-$ | Violet. |
| 132 | Br | $-C_2H_5$ | $-C_2H_5$ | $-C_2H_5$ | $-OC_2H_5$ | $-COO-$ | Reddish violet. |
| 133 | Cl | $-C_2H_5$ | $-CH_3$ | $-CH_3$ | H | $-CO-$ | Do. |
| 134 | H | $-CF_3$ | $C_2H_5$ | $-C_2H_5$ | H | $-CO-$ | Do. |
| 135 | H | $-CH_2Cl$ | $-C_2H_5$ | $-C_2H_5$ | H | $-CO-$ | Do. |
| 136 | H | $-CH_2CN$ | $-C_2H_5$ | $-C_2H_5$ | H | $-CO-$ | Violet. |
| 137 | H | $-CH_2CHCl_2$ | $-C_2H_5$ | $-C_2H_5$ | $-CH_3$ | $-COO-$ | Do. |
| 138 | H | $-C_2H_5$ | $-C_2H_5$ | $-C_2H_5$ | $-OC_2H_5$ | $-SO_2-$ | Pink. |
| 139 | H | $-CH_3$ | $-C_2H_5$ | $-C_2H_5$ | H | $-COO-$ | Violet. |
| 140 | H | $-C_2H_4Cl$ | $-C_2H_5$ | $-C_2H_5$ | H | $-COO-$ | Rose. |
| 141 | Br | $-CH_3$ | $-CH_3$ | $-CH_3$ | H | $-COO-$ | Do. |
| 142 | H | $-C_2H_5$ | $-C_3H_7$ | $-C_3H_7$ | H | $-COO-$ | Do. |
| 143 | H | $-C_2H_5$ | $-C_4H_9$ | $-C_4H_9$ | H | $-COO-$ | Do. |
| 144 | H | $-CH_3$ | $-C_2H_5$ | $-C_2H_5$ | $-OCH_3$ | $-COO-$ | Reddish violet. |
| 145 | H | $-C_2H_5$ | $-C_2H_5$ | $-C_2H_5$ | $-OC_2H_5$ | $-COO-$ | Do. |
| 146 | H | $-C_2H_5$ | $-CH_3$ | $-CH_3$ | $-CH_3$ | $-COO-$ | Rose. |
| 147 | H | $-CH_3$ | $-CH_3$ | $-CH_3$ | $-C_2H_5$ | $-COO-$ | Violet. |
| 148 | H | $-CH_3$ | $-C_2H_5$ | $-C_2H_5$ | $-OC_2H_5$ | $-CO-$ | Do. |
| 149 | H | $-CH_2Cl$ | $-C_2H_5$ | $-C_2H_5$ | $-CH_3$ | $-CO-$ | Do. |
| 150 | H | $-CH_2Cl$ | $-C_2H_5$ | $-C_2H_5$ | $-OC_2H_5$ | $-CO-$ | Rose. |
| 151 | H | $-CF_3$ | $-CH_3$ | $-CH_3$ | $-OCH_3$ | $-COO$ | Violet. |
| 152 | Br | $-C_2H_5$ | $-C_2H_5$ | $-C_2H_5$ | $-OC_2H_5$ | $-COO-$ | Do. |
| 153 | Cl | $-C_2H_5$ | $-C_2H_5$ | $-C_2H_5$ | $-CH_3$ | $-COO-$ | Do. |
| 154 | Cl | $-C_2H_5$ | $-C_2H_5$ | $-C_2H_5$ | H | $-COO-$ | Do. |
| 155 | H | $-CH_2-O-\text{C}_6\text{H}_5$ | $-C_2H_5$ | $C_2H_5$ | H | $-CO-$ | Reddish violet. |
| 156 | Cl | $-CH_2O-\text{C}_6\text{H}_5$ | $-C_2H_5$ | $-C_2H_5$ | H | $-CO-$ | Do. |
| 157 | Br | $-CH_2-O-\text{C}_6\text{H}_5$ | $-C_2H_5$ | $-C_2H_5$ | H | $-CO-$ | Do. |
| 158 | H | $-C-(CH_3)_3$ | $-C_2H_5$ | $-C_2H_5$ | H | $-CO-$ | Do. |
| 159 | Cl | $-C-(CH_3)_3$ | $-C_2H_5$ | $-C_2H_5$ | H | $-CO-$ | Do. |
| 160 | Br | $-C-(CH_3)_3$ | $-C_2H_5$ | $-C_2H_5$ | H | $-CO-$ | Do. |
| 161 | H | $-CH_2-O-C_2H_5$ | $-C_2H_5$ | $-C_2H_5$ | H | $-CO-$ | Do. |
| 162 | Cl | $-CH_2-O-C_2H_5$ | $-C_2H_5$ | $-C_2H_5$ | H | $-CO-$ | Do. |
| 163 | Br | $-CH_2-O-C_2H_5$ | $-C_2H_5$ | $-C_2H_5$ | H | $-CO-$ | Do. |

TABLE 5.—DYES OF FORMULA V

| Ex. No. | X | $A_5$ | $B_5$ | $D_5$ | $E_5$ | $G_5$ | $Y_5$ | Shade on Polyester Fibers |
|---|---|---|---|---|---|---|---|---|
| 164 | $-CH_3$ | Cl | $-C_2H_5$ | $-C_2H_5$ | $-C_2H_5$ | $-C_2H_5$ | $-COO-$ | Violet. |
| 165 | $-CH_3$ | Cl | $-CH_3$ | $-C_2H_5$ | $-C_2H_5$ | H | $-SO_2-$ | Do. |
| 166 | $-CH_3$ | Br | $-CH_3$ | $-C_2H_5$ | $-C_2H_5$ | $-OCH_3$ | $-SO_2-$ | Bluish violet. |
| 167 | $-CH_3$ | Br | $-CH_3$ | $-C_2H_5$ | $-C_2H_5$ | $-OC_2H_5$ | $-SO_2-$ | Do. |
| 168 | $-CH_3$ | Br | $-C_2H_5$ | $-CH_3$ | $-CH_3$ | $-CH_3$ | $-SO_2-$ | Do. |
| 169 | $-CH_3$ | Br | $-CH_3$ | $-CH_3$ | $-CH_3$ | $-C_2H_5$ | $-SO_2-$ | Do. |
| 170 | $-C_2H_4Cl$ | Cl | $-CH_3$ | $-CH_3$ | $-CH_3$ | $-C_2H_5$ | $-SO_2-$ | Do. |
| 171 | $-CH_3$ | Cl | $-C_2H_4Cl$ | $-CH_3$ | $-CH_3$ | H | $-SO_2-$ | Violet. |
| 172 | $-CH_3$ | H | $-CH_3$ | $-C_2H_5$ | $-C_2H_5$ | H | $-COO-$ | Reddish violet. |
| 173 | $-CH_3$ | H | $-CH_3$ | $-C_2H_5$ | $-C_2H_5$ | $-OC_2H_5$ | $-COO-$ | Do. |
| 174 | $-CH_3$ | H | $-C_2H_5$ | $-C_2H_5$ | $-C_2H_5$ | $-CH_3$ | $-SO_2-$ | Do. |
| 175 | $-CH_3$ | Cl | $-C_2H_4Cl$ | $-CH_3$ | $-CH_3$ | $-CH_3$ | $-COO-$ | Do. |
| 176 | $-CH_3$ | Br | $-C_2H_5$ | $-CH_3$ | $-CH_3$ | H | $-COO-$ | Violet. |
| 177 | $-CH_3$ | Br | $-C_2H_5$ | $-CH_3$ | $-CH_3$ | $-OCH_3$ | $-COO-$ | Do. |
| 178 | $-CH_3$ | Br | $-C_2H_5$ | $-CH_3$ | $-CH_3$ | $-OC_2H_5$ | $-COO-$ | Do. |
| 179 | $-C_2H_5$ | Br | $-C_2H_5$ | $-C_2H_5$ | $-C_2H_5$ | $-CH_3$ | $-COO-$ | Do. |

TABLE 6.—DYES OF FORMULA (VI)

| Ex. No. | $M_6$ | $A_6$ | $B_6$ | $D_6$ | $E_6$ | $G_6$ | $Y_6$ | Shade on Polyester Fibers |
|---|---|---|---|---|---|---|---|---|
| 180 | $-CN$ | Br | $-C_2H_5$ | $-C_2H_5$ | $-C_2H_5$ | Cl | $-COO-$ | Reddish blue. |
| 181 | $-CN$ | Br | $-CH_3$ | $-C_2H_5$ | $-C_2H_5$ | Br | $-SO_2-$ | Violet. |
| 182 | $-NO_2$ | Cl | $-CH_3$ | $-C_2H_5$ | $-C_2H_5$ | Cl | $-SO_2-$ | Do. |
| 183 | $-CF_3$ | Br | $-CH_3$ | $-C_2H_5$ | $-C_2H_5$ | Br | $-CO-$ | Reddish violet. |
| 184 | $-CF_3$ | Cl | $-CH_3$ | $-C_2H_5$ | $-C_2H_5$ | Cl | $-CO-$ | Do. |
| 185 | $-CF_3$ | H | $-C_2H_5$ | $-C_2H_5$ | $-C_2H_5$ | Cl | $-COO-$ | Rubine. |
| 186 | $-SO_2CH_3$ | Cl | $-C_2H_5$ | $-CH_3$ | $-CH_3$ | Cl | $-COO-$ | Violet. |
| 187 | $-SO_2CH_3$ | Cl | $-C_2H_5$ | $-CH_3$ | $-CH_3$ | Br | $-COO-$ | Do. |
| 188 | $-SO_2CH_3$ | Cl | $-CH_3$ | $-CH_3$ | $-CH_3$ | Cl | $-SO_2-$ | Do. |
| 189 | $-CN$ | Cl | $-CH_3$ | $-CH_3$ | $-CH_3$ | Cl | $-CO-$ | Reddish blue. |
| 190 | $-CN$ | Br | $-CH_3$ | $-C_2H_5$ | $-C_2H_5$ | Br | $-CO-$ | Do. |
| 191 | $-CN$ | Cl | $-CH_2Cl$ | $-CH_3$ | $-CH_3$ | Cl | $-CO-$ | Violet. |

TABLE 7.—DYES OF FORMULA VII

| Ex. No. | $M_7$ | $A_7$ | $B_7$ | $D_7$ | $E_7$ | $L_7$ | $Y_7$ | Shade on Polyester Fibers |
|---|---|---|---|---|---|---|---|---|
| 192 | $-NO_2$ | Br | $-CH_3$ | $-C_2H_5$ | $-C_2H_5$ | $-NH-CO-CH_3$ | CO | Blue. |
| 193 | $-CN$ | H | $-CH_3$ | $-CH_3$ | $-CH_3$ | $-NH-CO-CH_3$ | CO | Reddish blue. |
| 194 | $-CN$ | Br | $-CH_3$ | $-C_2H_5$ | $-C_2H_5$ | $-NH-CO-CH_3$ | CO | Blue. |
| 195 | $-CN$ | Cl | $-CH_3$ | $-C_2H_5$ | $-C_2H_5$ | $-NH-CO-CH_3$ | CO | Do. |
| 196 | $-CF_3$ | Br | $-CH_3$ | $-C_2H_5$ | $-C_2H_5$ | $-NH-CO-CH_3$ | CO | Violet. |
| 197 | $-CF_3$ | H | $-CH_3$ | $-C_2H_5$ | $-C_2H_5$ | $-NH-CO-CH_3$ | CO | Do. |
| 198 | $-CF_3$ | Cl | $-CH_3$ | $-C_2H_5$ | $-C_2H_5$ | $-NH-CO-CH_3$ | CO | Do. |
| 198a | $-SO_2CH_3$ | H | $-CH_3$ | $-C_2H_5$ | $-C_2H_5$ | $-NH-CO-CH_3$ | CO | Do. |

TABLE 8.—DYES OF FORMULA VIII

| Ex. No. | X | $A_8$ | $B_8$ | $D_8$ | $E_8$ | $G_8$ | Shade on Polyester Fibers |
|---|---|---|---|---|---|---|---|
| 199 | $-CH_3$ | H | $-CH_2Cl$ | $-C_2H_5$ | $-C_2H_5$ | H | Violet. |
| 200 | $-CH_3$ | Cl | $-CF_3$ | $-C_2H_5$ | $-C_2H_5$ | H | Do. |
| 201 | $-CH_3$ | Br | $-CF_3$ | $-C_2H_5$ | $-C_2H_5$ | H | Do. |
| 202 | $-CH_3$ | H | $-CHCl-CH_2Cl$ | $-C_2H_5$ | $-C_2H_5$ | H | Do. |
| 203 | $-CH_3$ | Cl | $-CH_2-CH_2Br$ | $-C_2H_5$ | $-C_2H_5$ | H | Do. |
| 204 | $-CH_3$ | Br | $-CH_2-CH_2Br$ | $-C_2H_5$ | $-C_2H_5$ | H | Do. |
| 205 | $-CH_3$ | H | $-CH_2-CH_2Cl$ | $-CH_3$ | $-CH_3$ | $-OC_2H_5$ | Blue. |
| 206 | $-CH_3$ | Cl | $-CH_2-CH_2Cl$ | $-C_3H_7$ | $-C_3H_7$ | H | Violet. |
| 207 | $-CH_3$ | Br | $-CH_2-CH_2Cl$ | $-CH_3$ | $-CH_3$ | $-CH_3$ | Do. |
| 208 | $-CH_3$ | Br | $-CH_2CN$ | $-C_2H_5$ | $-C_2H_5$ | $-C_2H_5$ | Do. |
| 209 | $-CH_3$ | Br | $-CH_2-CO-$ | $-C_2H_5$ | $-C_2H_5$ | H | Do. |
| 210 | $-CH_3$ | Cl | $-CHCl-CO-$ | $-C_2H_5$ | $-C_2H_5$ | H | Do. |
| 211 | $-CH_3$ | H | $-CH_2-O-C_2H_5$ | $-C_2H_5$ | $-C_2H_5$ | H | Do. |
| 212 | $-CH_3$ | Cl | $-CH_2-O-CH_3$ | $-C_2H_5$ | $-C_2H_5$ | H | Do. |

TABLE 9.—DYES OF FORMULA IX

| Example No. | A₉ | B₉ | D₉ | E₉ | G₉ | Shade on Polyester Fibers |
|---|---|---|---|---|---|---|
| 213 | Cl | —CH₃ | —CH₃ | —CH₃ | —OCH₃ | Greenish blue. |
| 214 | Cl | —CH₃ | —C₂H₅ | —C₂H₅ | —OCH₃ | Do. |
| 215 | Cl | —CH₃ | —C₂H₅ | —C₂H₅ | —CH₃ | Do. |
| 216 | Cl | —CH₃ | —C₂H₅ | —C₂H₅ | —C₂H₅ | Do. |
| 217 | Br | —C₂H₅ | —CH₃ | —CH₃ | —OCH₃ | Do. |
| 218 | Br | —CH₃ | —C₂H₅ | —C₂H₅ | —OC₂H₅ | Do. |
| 219 | Br | —C₂H₅ | —C₂H₅ | —C₂H₅ | —CH₃ | Do. |
| 220 | Br | —C₂H₅ | —C₂H₅ | —C₂H₅ | —C₂H₅ | Do. |
| 221 | Cl | —CH₂Cl | —CH₃ | —CH₃ | —OCH₃ | Do. |
| 222 | Cl | —CH₂Cl | —C₂H₅ | —C₂H₅ | —OC₂H₅ | Do. |
| 223 | Cl | —CH₂Cl | —C₂H₅ | —C₂H₅ | —CH₃ | Do. |
| 224 | Cl | —CH₂Cl | —C₂H₅ | —C₂H₅ | —C₂H₅ | Do. |
| 225 | Br | —CH₂Cl | —C₂H₅ | —C₂H₅ | —OC₂H₅ | Do. |
| 226 | Cl | —CH₂Cl | —C₂H₅ | —C₂H₅ | —OCH₃ | Do. |
| 227 | Cl | —CH₂CN | —CH₃ | —CH₃ | —OCH₃ | Do. |
| 228 | Br | —CH₂CN | —C₂H₅ | —C₂H₅ | —CH₃ | Do. |
| 229 | Br | —CF₃ | —C₂H₅ | —C₂H₅ | —OC₂H₅ | Reddish blue. |
| 230 | Br | —C₂H₄Cl | —C₂H₅ | —C₂H₅ | —OC₂H₅ | Do. |
| 231 | Br | —C₂H₃Cl₂ | —C₂H₅ | —C₂H₅ | —CH₃ | Do. |

Example 232

6.9 parts of powdered sodium nitrite are slowly added to 150 parts of concentrated sulphuric acid at 60–70° with stirring. Stirring is continued for a further 10 minutes at 60° and after cooling to 0° 19.7 parts of 2-amino-3-chloro-5-nitrobenzonitrile are added at this temperature. After a further 2 hours' stirring, the resulting diazonium salt solution is run into a cold mixture of 20.6 parts of 3-diethylamino-1-acetylaminobenzene, 20 parts of concentrated sulphuric acid, 20 parts of ice and 10 parts of aminosulphonic acid.

The coupling reaction is brought to a close in acid, if necessary buffered, medium at 0°. The dye formed is filtered off, washed free of acid and dried. It can be recrystallised from dimethyl formamide, upon which it melts at 250°. Its absorption maximum is at 588 millimicrons in dimethyl formamide solution. The dye dyes synthetic fibres in brilliant blue shades which have good fastness properties.

Example 233

6.9 parts of powdered sodium nitrite are added slowly to 120 parts of concentrated sulphuric acid at 60–70° with stirring. After stirring for a further 10 minutes at 60° the solution is cooled to 0° and at this temperature 24.2 parts of 2-amino-3-bromo-5-nitrobenzonitrile are added. Stirring is continued for 3 hours, then the resulting diazonium salt solution is run into a mixture of 20.6 parts of 3-diethylamino-1-acetylaminobenzene, 50 parts of glacial acetic acid and 40 parts of ice.

Coupling is completed at 0°. The dye is then filtered off, washed free of acid and dried. It can be recrystallised from dimethyl formamide, upon which it melts at 231°. Its absorption maximum in dimethylformamide solution is at 592 millimicrons. It dyes synthetic fibres in brilliant blue shades having good fastness properties.

Example 234

6.9 parts of sodium nitrite are added in small portions to 120 parts of concentrated sulphuric acid at 60–70° with stirring until completely dissolved. The solution is cooled to 15° and 100 parts of a mixture of 85 parts of glacial acetic acid and 15 parts of propionic acid are added, followed by 19.7 parts of 2-amino-3-chloro-5-nitrobenzonitrile. Stirring is continued for 2 hours, then at 15–20° a solution of 22 parts of 3-diethylamino-1-propionylaminobenzene in 30 parts of glacial acetic acid is added to the diazonium salt solution. The mixture is poured with vigorous stirring into a mixture of 200 parts of water and 500 parts of ice. The dye is filtered off with suction, washed free of acid and dried. Recrystallised from dimethyl formamide it melts at 189°. The absorption maximum is at 588 millimicrons in dimethyl formamide solution.

Example 235

6.9 parts of sodium nitrite are added slowly with stirring to 150 parts of 93% sulphuric acid at 60–70°. After stirring for a further 10 minutes at 70° and cooling to 0°, 24.2 parts of 2-amino-3-bromo-5-nitrobenzonitrile are added at this temperature. After 3 hours diazotisation is completed. The sulphuric acid diazonium salt solution is run into a cold mixture of 22 parts of 3-diethylamino-1-propionylaminobenzene, 30 parts of concentrated sulphuric acid, 20 parts of ice and 10 parts of aminosulphonic acid.

The coupling reaction is completed in a buffered medium at 0°. The dye is filtered off with suction, washed free of acid, dried and if desired recrystallised from dimethyl formamide. It melts at 183°. Its absorption maximum in dimethyl formamide solution is at 592 millimicrons.

Example 236

6.9 parts of sodium nitrite are added slowly with stirring to 120 parts of sulphuric acid at 60–70°. After stirring and cooling to 15°, 100 parts of a mixture of 85 parts of glacial acetic acid and 15 parts of propionic acid are added followed by 19.7 parts of 2-amino-3-chloro-5-nitrobenzonitrile. Stirring is continued for 2 hours. The diazonium salt solution is run into a cold mixture of 24 parts of 3-diethylamino-1-chloroacetylaminobenzene, 100 parts of glacial acetic acid, 150 parts of ice and 10 parts of aminosulphonic acid.

The coupling reaction is completed in a buffered medium at 0°. The dye is filtered off with suction, washed free of acid, dried and if desired, recrystallised from chlorobenzene. It melts at 198°.

Example 237

6.9 parts of sodium nitrite are added slowly with stirring to 150 parts of concentrated sulphuric acid at 60–70°. After cooling to 0° 19.7 parts of 2-amino-3-chloro-5-nitrobenzonitrile are added at 0–5°. Stirring is continued for 2 hours and the resulting diazonium salt solution poured into a mixture of 700 parts of ice and 7 parts of aminosulphonic acid. Immediately afterwards a solution of 17.8 parts of 3-dimethylamino-1-acetylaminobenzene in 100 parts of glacial acetic acid is run in, and sodium acetate added for neutralisation. The precipitated dye is filtered off, washed and dried. After recrystallisation from dimethyl formamide it melts at 248°. In dimethyl formamide solution its absorption maximum is at 588 millimicrons.

The dyes 2-cyano-4-nitro-6-chloro-2'-propionylamino-4'-bis-(methylamino)-1,1'-azobenzene, 2-cyano-4-nitro-6-bromo-2'-acetylamino-4'-bis - (methylamino) - 1,1' - azobenzene and 2-cyano-4-nitro-6-bromo-2'-propionylamino-4'-bis-(methylamino)-1,1'-azobenzene and also the dyes of Formula X listed in the following table can be produced in the same way using equivalent amounts of the diazonium compounds and azo components. These dyes yield blue dyeings on polyester fibers.

TABLE

| Ex. No. | $A_{10}$ | $B_{10}$ | $D_{10}$ | $E_{10}$ |
|---|---|---|---|---|
| 238 | Cl | —CH₃ | —C₃H₇ | —C₃H₇ |
| 239 | Br | —CH₃ | —C₄H₉ | —C₄H₉ |
| 240 | Cl | —C₂H₅ | —C₃H₇ | —C₃H₇ |
| 241 | Br | —C₂H₅ | —C₄H₉ | —C₄H₉ |
| 242 | Cl | —CH₂Cl | —CH₃ | —CH₃ |
| 243 | Cl | —CH₂Cl | —C₂H₅ | —C₂H₅ |
| 244 | Br | —CH₂Cl | —C₃H₇ | —C₃H₇ |
| 245 | Br | —CH₂Br | —C₂H₅ | —C₂H₅ |
| 246 | Cl | —CH₂CN | —CH₃ | —CH₃ |
| 247 | Br | —CF₃ | —C₂H₅ | —C₂H₅ |
| 248 | Cl | —C₂H₄Cl | —C₂H₅ | —C₂H₅ |
| 249 | Br | —CH₂—CHBr₂ | —C₂H₅ | —C₂H₅ |
| 250 | Cl | —CH₂—O—⌬ | —C₂H₅ | —C₂H₅ |
| 251 | Br | —CH₂—O—⌬ | —C₂H₅ | —C₂H₅ |
| 252 | Cl | —CH₂—O—C₂H₅ | —C₂H₅ | —C₂H₅ |
| 253 | Br | —CH₂—O—C₂H₅ | —C₂H₅ | —C₂H₅ |
| 254 | Cl | —CH—O—⌬, Cl | —C₂H₅ | —C₂H₅ |
| 255 | Cl | —C—(CH₃)₃ | —C₂H₅ | —C₂H₅ |
| 256 | Br | —C—(CH₃)₃ | —C₂H₅ | —C₂H₅ |

*Dyeing method.*—7 parts of the dye obtained according to the procedure of Example 1 are ground with 4 parts of sodium dinaphthylmethane disulphonate, 4 parts of sodium cetyl sulphate and 5 parts of anhydrous sodium sulphite in a ball mill for 48 hours until a fine powder is obtained. This dyeing preparation is suitable for dyeing fabrics of "Dacron" (registered trade mark) polyester fibre at 80–100° with additions of lauryl sulphonate and an aqueous emulsion of a chlorinated benzene, or in the absence of an accelerating agent at 110–140° under pressure.

Formulae of representative dyes of the foregoing examples are as follows:

*Example 1*

*Example 3*

*Example 16*

*Example 18*

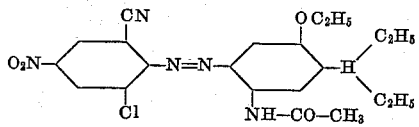

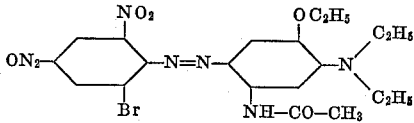

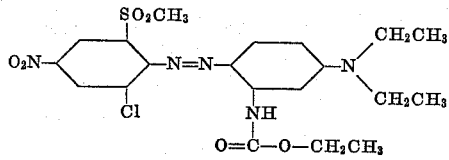

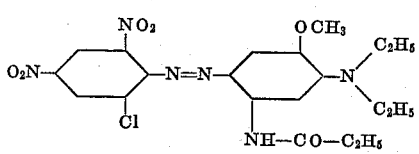

*Example 19*

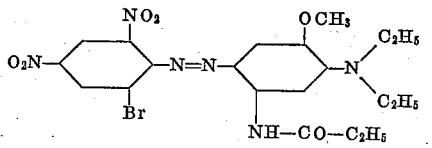

*Example 20*

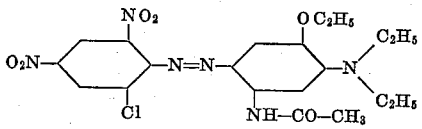

*Example 21*

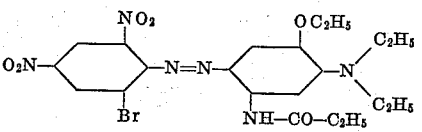

*Example 22*

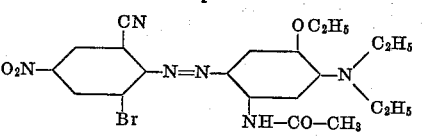

*Example 23*

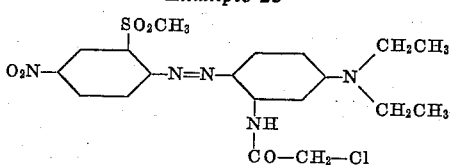

*Example 24*

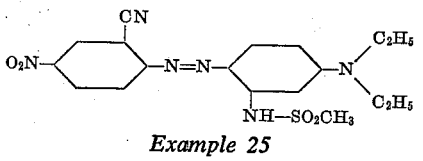

*Example 25*

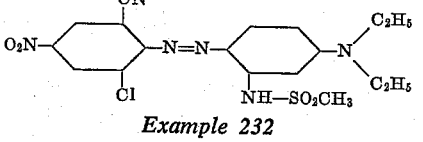

*Example 232*

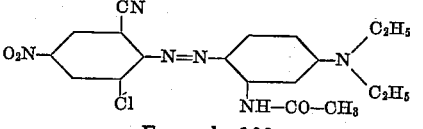

*Example 233*

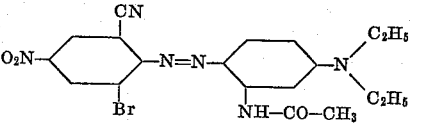

*Example 234*

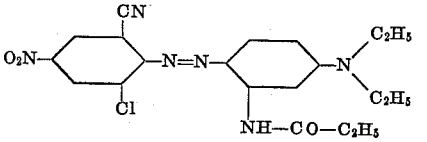

*Example 235*

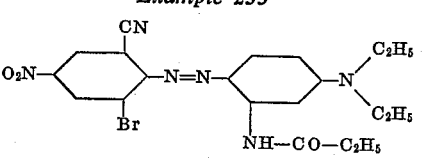

*Example 236*

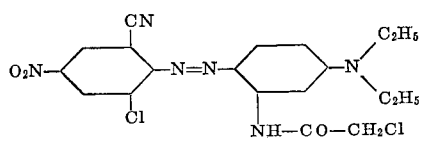

Having thus disclosed the invention what is claimed is:
1. Azo dye of the formula

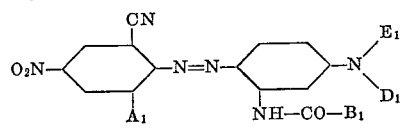

wherein
$A_1$ represents a member selected from the group consisting of hydrogen, chlorine and bromine,
$B_1$ represents a member selected from the group consisting of alkyl, monochloroalkyl, monobromoalkyl and cyanoalkyl, each alkyl having 1 to 4 carbon atoms, methoxymethyl, ethoxymethyl, phenyloxymethyl and phenyloxychloromethyl,
$D_1$ represents low molecular alkyl and
$E_1$ represents low molecular alkyl.

2. The dye of the formula

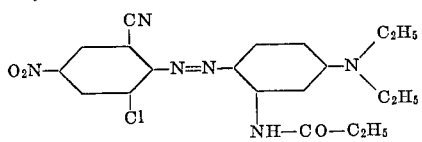

3. The dye of the formula

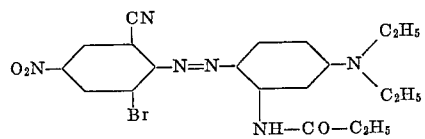

4. The dye of the formula

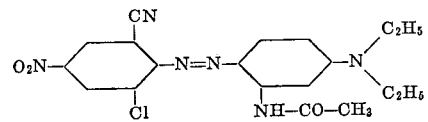

5. The dye of the formula

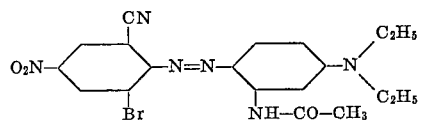

6. The dye of the formula

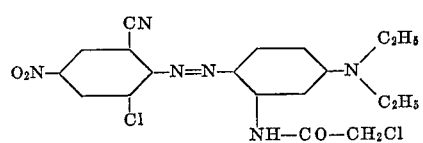

7. The dye of the formula

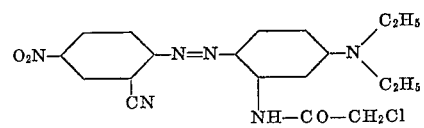

8. The dye of the formula

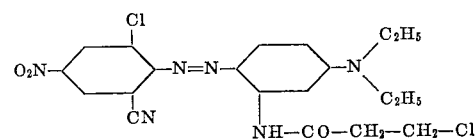

References Cited

UNITED STATES PATENTS

| | | | |
|---|---|---|---|
| 2,083,308 | 6/1937 | Senn | 260—207 |
| 2,111,300 | 3/1938 | Senn | 260—207 X |
| 2,155,755 | 4/1939 | Felix et al. | 260—207 |
| 2,231,021 | 2/1941 | McNally et al. | 260—205 |
| 2,289,349 | 7/1942 | Dickey et al. | 260—205 |
| 2,436,100 | 2/1948 | Dickey | 260—207 |
| 2,955,901 | 10/1960 | Kruckenberg | 260—158 X |
| 3,139,422 | 6/1964 | Booth et al. | 260—206 X |

CHARLES B. PARKER, *Primary Examiner.*

JOSEPH P. BRUST, *Examiner.*

F. HIGEL, *Assistant Examiner.*